US005081596A

United States Patent [19]
Vincent et al.

[11] Patent Number: 5,081,596
[45] Date of Patent: Jan. 14, 1992

[54] TEXT AND COLOR IMAGE PRINTING SYSTEM

[75] Inventors: Kent Vincent, Cupertino; William J. Lloyd, Belmont, both of Calif.

[73] Assignee: Hewlett-Packard Company, Palo Alto, Calif.

[21] Appl. No.: 668,535

[22] Filed: Mar. 13, 1991

[51] Int. Cl.⁵ .................................... G06K 15/00
[52] U.S. Cl. .................. 395/104; 364/930; 364/DIG. 2; 395/109
[58] Field of Search ............... 364/518-520, 364/235 MS, 930 MS; 346/1.1, 49, 157, 154; 400/82; 558/300, 75, 296

[56] References Cited

U.S. PATENT DOCUMENTS 3,913,719 10/1975 Fray ........................... 346/1.1
4,554,556 11/1985 Hirata et al. ................. 346/49

Primary Examiner—Arthur G. Evans

[57] ABSTRACT

A desktop printer for plain paper sheets includes the integral combination of a color printer and a text printer. The color printer is of the inkjet type to print color images incrementally and the text printer is of the laser-electrophotographic type to print monochrome text continuously. The printing information is segregated into color and text components, and the color printer is controlled to print only color components while the text printer is controlled to print only text components. A conveyor transports sheets from the text print engine to the color image print engine with incremental indexing motion.

14 Claims, 1 Drawing Sheet

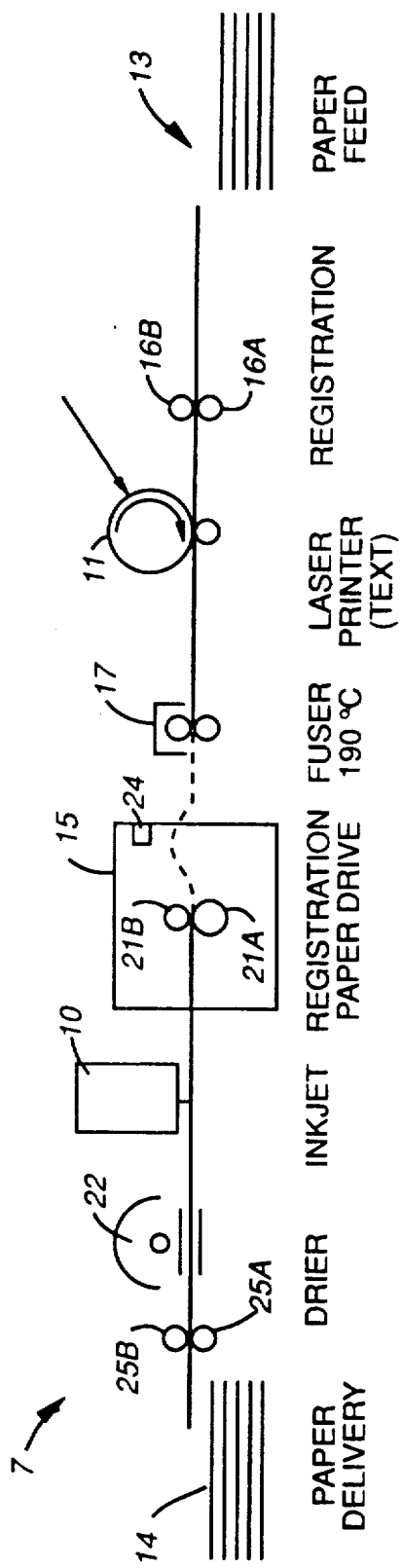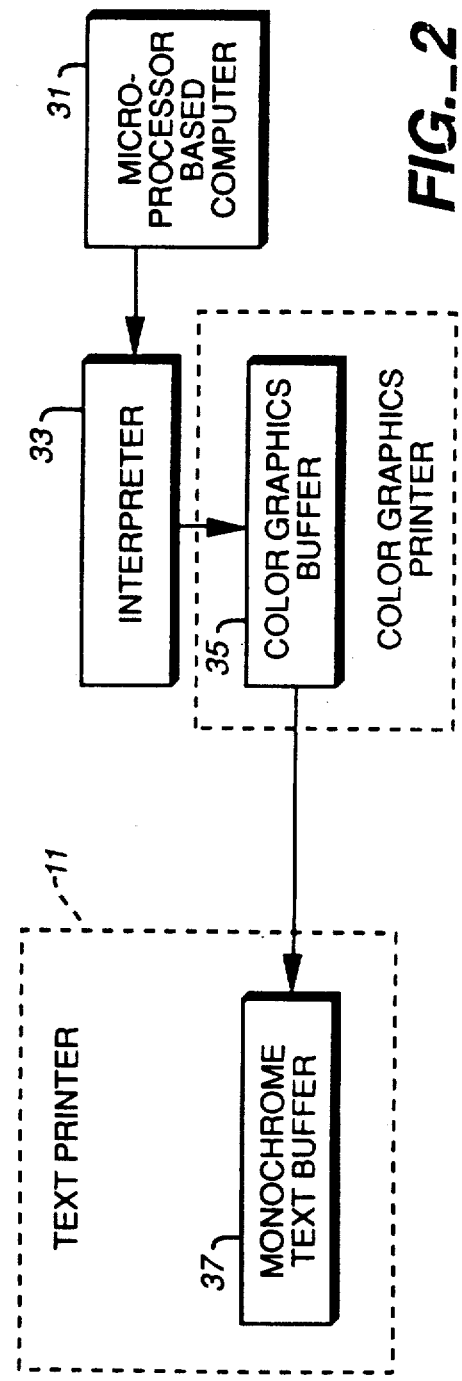

TEXT AND COLOR IMAGE PRINTING SYSTEM

BACKGROUND OF THE INVENTION

1. Field of the Invention

The present invention generally relates to text and image printing systems for use with microprocessor-based computers and, more particularly, to systems for printing text and multi-color images.

2. State of the Art

Conventional desk-top printing systems have several shortcomings when applied to the task of printing multi-color images. For instance, although color printers of the laser-electrophotographic type can produce high quality images, such printers require complex mechanisms that sequentially form and align frames when producing images in multiple colors. Thus, electrophotographic printers are often too costly for desktop publishing applications using microprocessor-based computers.

Although many desktop printers can print high-quality text and other desktop printers can provide high-quality multi-color images, conventional desktop printers cannot rapidly print both high quality text and multi-color images. For instance, thermal transfer printers provide acceptable color images but do not provide sufficient line acuity to print document-quality text. On the other hand, laser printers and dot matrix printers rapidly print high-quality text in desktop applications, but do not provide high-quality multi-color images.

Thus, a need exists for low-cost, high-speed desktop printing devices that can be used with microprocessor-based computers to print high-quality color images as well as high-quality text.

SUMMARY OF THE INVENTION

Generally speaking, the present invention provides a desktop printing system for rapidly printing high-quality color images as well as high-quality text plain paper sheets. More particularly, the present invention comprises the integral combination of a color image printer and a text printer. Still more particularly, the present invention comprises the integral combination of a text print engine of one type and a color image print engine of another type, microprocessor means for receiving printing information and for segregating the received printing information into color image information and monochrome text information, and control means for controlling the text print engine to print only monochrome text information and for controlling the color image print engine to print only color image information.

In the preferred embodiment of the present invention, the color print engine prints color image information incrementally and the text print engine prints text continuously. In this embodiment, a conveyor system is mounted to transport sheets from the text print engine to the color image print engine with incremental indexing motion. Also, it is preferred that the color print engine is arranged to follow the text print engine.

Still further in the preferred embodiment of the present invention, the color printer is of the inkjet type for printing color image information incrementally, and the text printer is of the laser-electrophotographic type for printing monochrome text continuously. In practice, the printing information is segregated into color image and monochrome text components, and the color printer is controlled to print only the color components while the text printer is controlled to print only the monochrome text components.

BRIEF DESCRIPTION OF THE DRAWINGS

The present invention can be further understood by reference to the following description and attached drawings which illustrate the preferred embodiment of the invention. For purposes of clarity, identical parts are given the same reference numbers in the various drawing figures. In the drawings:

FIG. 1 is a schematic diagram illustrating one embodiment of a integral combination of a text and color image printer according to the present invention; and FIG. 2 is a functional block diagram showing one example of a system for controlling the integral text and color image printer of FIG. 1.

DETAILED DESCRIPTION OF THE PREFERRED EMBODIMENT

Generally speaking, FIG. 1 shows an integral text and color image printer with the combination being designated by the number 7. In the illustrated embodiment, the system comprises the integral combination of a color image printer 10 of one type and a monochrome text printer 11 of another type. The color image printer 10 is normally the type that prints with incremental sheet motion whereas monochrome text printer is the type that prints with continuous sheet motion. (In the case of color image printer 10, the periods when sheets are stationary between indexing intervals allow the color image print engine to be driven across the sheets to print swaths of ink dots.)

Further as shown in FIG. 1, the color image printer 10 is separated from the monochrome text printer 11 by a conveyor system 15. The purpose of the conveyor system is for accommodating differences between the continuous movement of sheets through the monochrome text printer and the incremental movement of sheets through the color image printer. Further, the conveyor system allows the color image printer 10 and monochrome text printer 11 to operate at different through-put rates while the speed differences are automatically accommodated by conveyor system 15.

In practice, color image printer 10 can be based on one of several technologies but, preferably, is a multi-color inkjet printer such as the HP PaintJet color image printer which is manufactured and sold by the Hewlett-Packard Company of Palo Alto, Calif. The monochrome text printer 11 is preferably a laser-electrophotographic printer that uses printing technology such as found in the Hewlett-Packard Laser Jet I and Laser Jet II printers.

Generally speaking, the integral printer 7 in FIG. 1 operates such that sheets are initially printed only with monochrome text (i.e., alpha-numeric characters) by monochrome text printer 11. Then, within the integral printer, the text sheets are individually conveyed to color image printer 10 where they are printed with color images. In the case where color image printer 10 is a multi-color inkjet printer, its print engine normally is mounted for movement back and forth perpendicular to the direction of sheet travel while the sheets are driven through the printer. After each swath is printed by the color printer, the sheet is advanced by a distance equal to the swath width so that apparently continuous color images are printed longitudinally along the sheets. The fully printed pages—containing both text and color images—are delivered to sheet output device 14 by opposed rollers 25A and 25B.

In the specific embodiment illustrated in FIG. 1, sheet feed device 13 can be understood to be a generally conventional mechanism that extracts sheets one-by-one from a supply stack of sheets. Further in the illustrated embodiment, sheet feed device 13 is arranged to feed the extracted sheets between a pair of opposed drive rollers 16A and 16B that drive the sheets individually to monochrome text printer 11. Still further in the illustrated embodiment, a fuser system 17 is arranged to receive the sheets after monochrome text printer 11.

As also shown in FIG. 1, conveyor system 15 is arranged to receive individual sheets from fuser system 17. In the illustrated embodiment, conveyor system 15 includes a pair of opposed drive rollers 21A and 21B, respectively, that are mounted to feed sheets individually to color image printer 10. Still further in the illustrated embodiment, conveyor system 15 includes a sensor system 24 for sensing the presence of sheets that are delivered from the monochrome text printer 11 and for controlling the drive rollers 21A and 21B.

The operation of conveyor system 15 in FIG. 1 will now be described. In practice, as mentioned above, sheets are driven generally continuously (i.e., not incrementally) to conveyor system 15 from monochrome text printer 11. Upon arrival at conveyor system 15, the sheets are sensed by sensor system 24. Then, the sensor system controls the drive rollers 21A and 21B such that, as the leading edge of each of the text-printed sheets is engaged by the drive rollers 21A and 21B, the sheets are incrementally indexed for feeding through color image printer 10. In practice, it is important for the drive rollers 21A and 21B to be controlled in a manner that avoids sheet buckling.

Still further in the embodiment illustrated in FIG. 1, a dryer 22 is mounted to receive sheets after printing b color image printer 10. Dryer 22 can comprise, for example, a radiant heating device that extend laterally across the full width of the traveling sheets. Alternatively, a dryer could be integral to color image printer 10 for drying sheets during the color image printing process; such a dryer could, for instance, be placed under the sheets at the point of ink impact.

In practice, the temperature of dryer 22 is thermostatically controlled so that paper sheets are not browned or otherwise adversely affected during the drying operation. Following the dryer, rollers 25A and 25B engage and drive the dried sheets into sheet output device 14. Generally speaking, dryer 22 operates such that the color images on the printed sheets are dried sufficiently that they are not smeared when the sheet is subsequently engaged by rollers 25A and 25B.

FIG. 2 shows a system for electronically controlling integral printer 7 to print text and color image information. A similar system is disclosed in pending U.S. Patent application Ser. No. 07/284,886, commonly assigned herewith. The disclosure of this co-pending application is incorporated hereinto by reference in its entirety.

In the electronic control system shown in FIG. 2, a microprocessor-based computer 31 provides information for printing to a interpreter 33. The printing information can include text as well as for image information. In the preferred embodiment, interpreter 33 is a programmable microprocessor such as a Motorola 68000 microprocessor and is located in the program memory of integral printer 7. Such an interpreter can be connected to microprocessor-based computer 31 by, for example, a Centronics parallel interface port. Further in the illustrated control system, the output of interpreter 33 is connected to both a color image buffer 35 and to a monochrome text buffer 37.

In operation of the control system of FIG. 2, microprocessor-based computer 31 provides printing data to interpreter 33. The interpreter segregates the data into color image and monochrome alpha-numeric components, respectively. In practice, segregation of data is usually accomplished by reading commands, such as Hewlett-Packard Printer Command Language (PCL) commands, that are issued by the microprocessor-based computer 31 when it outputs blocks of text and image data. At appropriate intervals, interpreter 33 directs color image data to the print engine for color image printer 10 and directs textual data to the print engine for monochrome text printer 11. Accordingly, the color image printer is controlled to print only color components, and the text printer is controlled to print only textual (i.e., alphanumeric) information.

While the present invention has been illustrated and described in accordance with a preferred embodiment, it should be recognized that variations and changes may be made therein without departing from the invention as set forth in the following claims. For example, although color image printer 10 follows the print engine for the monochrome text printer 11 in the system of FIG. 1, the sequence can be reversed. Accordingly, the above-described embodiments should be regarded as illustrative rather than restrictive, and it should be appreciated that variations may be made in those embodiments by workers skilled in the art without departing from the spirit or scope of present invention as defined by the following claims.

What is claimed is:

1. A printer for use with a microprocessor-based computer for sequentially printing monochrome text and color images on plain paper sheets, comprising:
   printer means comprising the integral combination of a text print engine of one type and a color image print engine of another type, the color print engine being of the type that prints color image information incrementally and the text print engine being of the type that prints text continuously;
   microprocessor means for receiving printing information from a microprocessor-based computer and for segregating the received printing information into color image information and monochrome text information; and
   control means for controlling the text print engine to print only monochrome text information and for controlling the color image print engine to print only color image information.

2. A printer for use with a microprocessor-based computer for sequentially printing monochrome text and color images on plain paper sheets, comprising:
   printer means comprising the integral combination of a text print engine of the type that prints text continuously, and a color image print engine of the type that prints color image information incrementally;
   conveyor means for transporting sheets from the text print engine to the color image print engine with incremental indexing motion;
   microprocessor means for receiving printing information from a microprocessor-based computer and for segregating the received printing information into color image information and monochrome text information; and control means for controlling the text print engine to print only monochrome text information and for controlling the color image print engine to print only color image information.

3. A printer according to claim 1 further including conveyor means for transporting sheets through the color image print engine with incremental indexing motion.

4. A printer according to claim 1 wherein the color print engine is arranged to follow the text print engine.

5. A printer according to claim 1 wherein the color print engine is of the inkjet type.

6. A printer according to claim 1, wherein the text print engine is of the electrophotographic type.

7. A printer according to claim 1 further including ink drying means operative to apply heat to sheets after color printing.

8. A printer according to claim 1 further including fuser means to fuse ink to the sheets after text printing but before color printing.

9. An integral printer for serially printing monochrome text and color images on plain paper sheets comprising:

the unitary combination of a color image print engine for printing color images incrementally and a text print engine for printing text continuously;

sheet transport means for transporting sheets with continuous motion through the text print engine and for transporting sheets with incremental motion through the color image print engine; and control means for segregating graphical information from text information and for directing only graphical information to the color image print engine and only text information to the text print engine.

10. A printer according to claim 9 wherein the color print engine is arranged to follow the text print engine.

11. A printer according to claim 9 and further including conveyor means for transporting sheets from the text print engine to the color image print engine with incremental indexing motion.

12. A printer according to claim 9 wherein the color print engine is of the inkjet type.

13. A printer according to claim 9 wherein the text print engine is of the electrophotographic type.

14. The printer of claim 9, further including a heater operative to heat sheet both prior to text printing and subsequent to color image printing.

* * * * *